US007120430B2

(12) United States Patent
Christenson et al.

(10) Patent No.: US 7,120,430 B2
(45) Date of Patent: Oct. 10, 2006

(54) PROGRAMMABLE INTEROPERABLE APPLIANCE REMOTE CONTROL

(75) Inventors: Keith A. Christenson, Canton, MI (US); Saurabh S. Trivedi, Ann Arbor, MI (US); Jody K. Harwood, Canton, MI (US)

(73) Assignee: Lear Corporation, Southfield, MI (US)

( * ) Notice: Subject to any disclaimer, the term of this patent is extended or adjusted under 35 U.S.C. 154(b) by 152 days.

(21) Appl. No.: 10/630,168

(22) Filed: Jul. 30, 2003

(65) Prior Publication Data

US 2005/0026604 A1 Feb. 3, 2005

(51) Int. Cl.
*H04Q 7/20* (2006.01)
*H04M 3/00* (2006.01)

(52) U.S. Cl. .................................... 455/419; 455/418

(58) Field of Classification Search ................ 455/419, 455/418; 340/825.22, 825.72; 380/270, 380/273, 274
See application file for complete search history.

(56) References Cited

U.S. PATENT DOCUMENTS 1,522,241 A 1/1925 Hennessey
3,098,212 A 7/1963 Creamer, Jr.
3,300,867 A 1/1967 Sampson
3,337,992 A 8/1967 Tolson
3,456,387 A 7/1969 Tolson
3,680,951 A 8/1972 Jordan et al.
4,074,200 A 2/1978 Buchta
4,167,833 A 9/1979 Farina et al.
4,178,549 A 12/1979 Ledenbach et al.
4,219,812 A 8/1980 Rittenbach
4,241,870 A 12/1980 Marcus
4,247,850 A 1/1981 Marcus
4,425,717 A 1/1984 Marcus
4,447,808 A 5/1984 Marcus
4,453,161 A 6/1984 Lemelson
4,482,947 A 11/1984 Zato et al.
4,529,980 A 7/1985 Liotine et al.
4,535,333 A 8/1985 Twardowski
4,581,827 A 4/1986 Higashi
4,595,228 A 6/1986 Chu
4,598,287 A 7/1986 Osakabe et al.
4,623,887 A 11/1986 Welles, II
4,631,708 A 12/1986 Wood et al.

(Continued)

FOREIGN PATENT DOCUMENTS

EP 0 670 402 A1 9/1995

(Continued)

OTHER PUBLICATIONS

Combined Search and Examination Report Under Sections 17 and 18(3) mailed Nov. 2, 2004 for European patent application GB 0416789.6.

(Continued)

*Primary Examiner*—Erika A. Gary
(74) *Attorney, Agent, or Firm*—Brooks Kushman P.C.

(57) ABSTRACT

A universal remote control establishes a new transmitter identifier when programmed to a particular rolling code scheme by an existing transmitter. During programming, the universal remote control receives at least one activation signal transmitted from the existing transmitter. The activation signal includes an existing transmitter identifier. The activation signal is examined to determine which of a plurality of rolling code schemes was used by the existing transmitter to generate the received activation signal. The new transmitter identifier, different from the existing transmitter identifier, is determined based on the rolling code scheme. Subsequently, when an activation input is received, the universal remote control generates and transmits a new activation signal including the new transmitter identifier.

19 Claims, 5 Drawing Sheets

U.S. PATENT DOCUMENTS

| | | | |
|---|---|---|---|
| 4,635,033 | A | 1/1987 | Inukai et al. |
| 4,638,433 | A | 1/1987 | Schindler |
| 4,665,397 | A | 5/1987 | Pinnow |
| 4,676,601 | A | 6/1987 | Itoh et al. |
| 4,700,327 | A | 10/1987 | Hilton |
| 4,706,299 | A | 11/1987 | Jorgensen |
| 4,707,788 | A | 11/1987 | Tashiro et al. |
| RE32,576 | E | 1/1988 | Pastore |
| 4,727,302 | A | 2/1988 | Mizuta et al. |
| 4,743,905 | A | 5/1988 | Wiegand |
| 4,747,159 | A | 5/1988 | Kato |
| 4,750,118 | A | 6/1988 | Heitschel et al. |
| 4,754,255 | A | 6/1988 | Sanders et al. |
| 4,771,283 | A | 9/1988 | Imoto |
| 4,793,690 | A | 12/1988 | Gahan et al. |
| 4,799,189 | A | 1/1989 | Grover |
| 4,806,930 | A | 2/1989 | Wojciak, Jr. |
| 4,825,200 | A | 4/1989 | Evans et al. |
| 4,881,148 | A | 11/1989 | Lambropoulos et al. |
| 4,882,565 | A | 11/1989 | Gallmeyer |
| 4,886,960 | A | 12/1989 | Molyneux et al. |
| 4,890,108 | A | 12/1989 | Drori et al. |
| 4,896,030 | A | 1/1990 | Miyaji |
| 4,905,279 | A | 2/1990 | Nishio |
| 4,912,463 | A | 3/1990 | Li |
| 4,917,477 | A | 4/1990 | Bechtel et al. |
| 4,953,305 | A | 9/1990 | Van Lente et al. |
| 4,978,944 | A | 12/1990 | Andros et al. |
| 4,988,992 | A | 1/1991 | Heitschel et al. |
| 5,016,996 | A | 5/1991 | Ueno |
| 5,064,274 | A | 11/1991 | Alten |
| 5,085,062 | A | 2/1992 | Capdevila |
| 5,103,221 | A | 4/1992 | Memmola |
| 5,109,222 | A | 4/1992 | Welty |
| 5,113,821 | A | 5/1992 | Fukui et al. |
| 5,122,647 | A | 6/1992 | Lynam et al. |
| 5,123,008 | A | 6/1992 | Beesley |
| 5,126,686 | A | 6/1992 | Tam |
| 5,146,215 | A | 9/1992 | Drori |
| 5,154,617 | A | 10/1992 | Suman et al. |
| 5,181,423 | A | 1/1993 | Philipps et al. |
| 5,191,610 | A | 3/1993 | Hill et al. |
| 5,193,210 | A | 3/1993 | Nicholas et al. |
| 5,201,067 | A | 4/1993 | Grube et al. |
| 5,225,847 | A | 7/1993 | Roberts et al. |
| 5,243,322 | A | 9/1993 | Thompson et al. |
| 5,252,960 | A | 10/1993 | Duhame |
| 5,252,977 | A | 10/1993 | Lueker et al. |
| 5,266,945 | A | 11/1993 | Peek et al. |
| 5,278,547 | A | 1/1994 | Suman et al. |
| 5,369,706 | A | 11/1994 | Latka |
| 5,379,453 | A | 1/1995 | Tigwell |
| 5,402,105 | A | 3/1995 | Doyle et al. |
| 5,408,698 | A | 4/1995 | Serizawa et al. |
| 5,412,379 | A | 5/1995 | Waraksa et al. |
| 5,420,925 | A | 5/1995 | Michaels |
| 5,442,340 | A | 8/1995 | Dykema |
| 5,455,716 | A | 10/1995 | Suman et al. |
| 5,463,374 | A | 10/1995 | Mendez et al. |
| 5,471,668 | A | 11/1995 | Soenen et al. |
| 5,473,317 | A | 12/1995 | Inomata et al. |
| 5,475,366 | A | 12/1995 | Van Lente et al. |
| 5,479,155 | A | 12/1995 | Zeinstra et al. |
| 5,517,187 | A | 5/1996 | Bruwer et al. |
| 5,528,230 | A | 6/1996 | Kim |
| 5,554,977 | A | 9/1996 | Jablonski et al. |
| RE35,364 | E | 10/1996 | Heitschel et al. |
| 5,564,101 | A | 10/1996 | Eisfeld et al. |
| 5,583,485 | A | 12/1996 | Van Lente et al. |
| 5,594,429 | A | 1/1997 | Nakahara |
| 5,596,316 | A | 1/1997 | Honeck |
| 5,598,475 | A | 1/1997 | Soenen et al. |
| 5,613,732 | A | 3/1997 | Demick |
| 5,614,885 | A | 3/1997 | Van Lente et al. |
| 5,614,891 | A | 3/1997 | Zeinstra et al. |
| 5,619,190 | A | 4/1997 | Duckworth et al. |
| 5,627,529 | A | 5/1997 | Duckworth et al. |
| 5,645,308 | A | 7/1997 | Fink |
| 5,646,701 | A | 7/1997 | Duckworth et al. |
| 5,661,455 | A | 8/1997 | Van Lente et al. |
| 5,661,651 | A | 8/1997 | Geschke et al. |
| 5,661,804 | A | 8/1997 | Dykema et al. |
| 5,680,131 | A | 10/1997 | Utz |
| 5,680,134 | A | 10/1997 | Tsui |
| 5,686,903 | A | 11/1997 | Duckworth et al. |
| 5,686,904 | A | 11/1997 | Bruwer |
| 5,691,848 | A | 11/1997 | Van Lente et al. |
| 5,699,044 | A | 12/1997 | Van Lente et al. |
| 5,699,054 | A | 12/1997 | Duckworth |
| 5,699,055 | A | 12/1997 | Dykema et al. |
| 5,708,415 | A | 1/1998 | Van Lente et al. |
| 5,715,020 | A | 2/1998 | Kuroiwa et al. |
| 5,731,756 | A | 3/1998 | Roddy |
| 5,751,224 | A | 5/1998 | Fitzgibbon |
| 5,793,300 | A | 8/1998 | Suman et al. |
| 5,812,097 | A | 9/1998 | Maldonado |
| 5,831,548 | A | 11/1998 | Fitzgibbon |
| 5,838,255 | A | 11/1998 | Di Croce |
| 5,841,253 | A | 11/1998 | Fitzgibbon et al. |
| 5,841,390 | A | 11/1998 | Tsui |
| 5,841,813 | A | 11/1998 | Van Nee |
| 5,845,593 | A | 12/1998 | Birkestrand |
| 5,854,593 | A | 12/1998 | Dykema et al. |
| 5,872,513 | A | 2/1999 | Fitzgibbon et al. |
| 5,903,226 | A | 5/1999 | Suman et al. |
| 5,926,087 | A | 7/1999 | Busch et al. |
| 5,926,106 | A | 7/1999 | Beran et al. |
| 5,940,000 | A | 8/1999 | Dykema |
| 5,940,007 | A | 8/1999 | Brinkmeyer |
| 5,940,120 | A | 8/1999 | Frankhouse et al. |
| 5,949,349 | A | 9/1999 | Farris et al. |
| 6,002,332 | A | 12/1999 | King |
| 6,005,508 | A | 12/1999 | Tsui |
| 6,008,735 | A | 12/1999 | Chiloyan et al. |
| 6,009,355 | A | 12/1999 | Obradovich et al. |
| 6,021,319 | A | 2/2000 | Tigwell |
| 6,025,785 | A | 2/2000 | Farris et al. |
| 6,031,465 | A | 2/2000 | Burgess |
| 6,043,753 | A | 3/2000 | Okayasu et al. |
| 6,049,289 | A | 4/2000 | Waggamon et al. |
| 6,055,508 | A | 4/2000 | Naor et al. |
| RE36,703 | E | 5/2000 | Heitschel et al. |
| 6,072,436 | A | 6/2000 | Marougi |
| 6,078,271 | A | 6/2000 | Roddy et al. |
| 6,081,203 | A | 6/2000 | Fitzgibbon |
| 6,091,343 | A | 7/2000 | Dykema et al. |
| 6,104,101 | A | 8/2000 | Miller et al. |
| 6,127,740 | A | 10/2000 | Roddy et al. |
| 6,130,625 | A | 10/2000 | Harvey |
| 6,131,019 | A | 10/2000 | King |
| 6,137,421 | A | 10/2000 | Dykema |
| 6,154,544 | A | 11/2000 | Farris et al. |
| 6,166,650 | A | 12/2000 | Bruwer |
| 6,175,312 | B1 | 1/2001 | Bruwer et al. |
| 6,181,255 | B1 | 1/2001 | Crimmins et al. |
| 6,191,701 | B1 | 2/2001 | Bruwer |
| 6,243,000 | B1 | 6/2001 | Tsui |
| 6,249,673 | B1 | 6/2001 | Tsui |
| 6,271,765 | B1 | 8/2001 | King et al. |
| 6,282,152 | B1 | 8/2001 | Kurple |
| 6,308,083 | B1 | 10/2001 | King |
| 6,320,514 | B1 | 11/2001 | Flick |
| 6,333,698 | B1 | 12/2001 | Roddy |
| 6,344,817 | B1 | 2/2002 | Verzulli |

| | | | | |
|---|---|---|---|---|
| 6,359,558 | B1 | 3/2002 | Tsui | |
| 6,362,771 | B1 | 3/2002 | Schofield et al. | |
| 6,397,058 | B1 | 5/2002 | Thibert et al. | |
| 6,414,587 | B1 | 7/2002 | Fitzgibbon | |
| 6,441,719 | B1 | 8/2002 | Tsui | |
| 6,486,795 | B1 | 11/2002 | Sobel et al. | |
| RE37,986 | E | 2/2003 | Heitschel et al. | |
| 6,525,645 | B1 | 2/2003 | King et al. | |
| 6,542,076 | B1 | 4/2003 | Joao | |
| 6,556,681 | B1 | 4/2003 | King | |
| 6,556,813 | B1 | 4/2003 | Tsui | |
| 6,559,775 | B1 | 5/2003 | King | |
| 6,597,291 | B1 | 7/2003 | Tsui | |
| 6,634,408 | B1 | 10/2003 | Mays | |
| 6,661,350 | B1 | 12/2003 | Rohrberg et al. | |
| 6,690,796 | B1 | 2/2004 | Farris et al. | |
| 6,703,941 | B1 | 3/2004 | Blaker | |
| 6,759,943 | B1 | 7/2004 | Lucy et al. | |
| 6,791,467 | B1 | 9/2004 | Ben-Ze'ev | |
| 6,810,123 | B1 | 10/2004 | Farris et al. | |
| 6,822,603 | B1 | 11/2004 | Crimmins et al. | |
| 6,903,650 | B1 | 6/2005 | Murray | |
| 6,956,460 | B1 | 10/2005 | Tsui | |
| 6,963,267 | B1 | 11/2005 | Murray | |
| 6,975,203 | B1 | 12/2005 | Brookbank et al. | |
| 2002/0034303 | A1 | 3/2002 | Farris et al. | |
| 2002/0067826 | A1 | 6/2002 | King | |
| 2002/0075133 | A1 | 6/2002 | Flick | |
| 2002/0126037 | A1 | 9/2002 | Fitzgibbon | |
| 2002/0137479 | A1 | 9/2002 | Tsui | |
| 2002/0140569 | A1 | 10/2002 | van Ee et al. | |
| 2002/0163440 | A1 | 11/2002 | Tsui | |
| 2002/0190872 | A1 | 12/2002 | Suman et al. | |
| 2002/0191794 | A1 | 12/2002 | Farris et al. | |
| 2002/0197955 | A1 | 12/2002 | Witkowski et al. | |
| 2003/0016119 | A1 | 1/2003 | Teich | |
| 2003/0016139 | A1 | 1/2003 | Teich | |
| 2003/0033540 | A1 | 2/2003 | Fitzgibbon | |
| 2003/0067394 | A1 | 4/2003 | Tsui | |
| 2003/0076235 | A1 | 4/2003 | Tsui | |
| 2003/0085798 | A1* | 5/2003 | Castro Esteban | 340/5.62 |
| 2003/0118187 | A1 | 6/2003 | Fitzgibbon | |
| 2003/0189530 | A1 | 10/2003 | Tsui | |
| 2003/0197594 | A1 | 10/2003 | Olson et al. | |
| 2003/0197595 | A1 | 10/2003 | Olson et al. | |
| 2003/0216139 | A1 | 11/2003 | Olson et al. | |
| 2003/0228879 | A1 | 12/2003 | Witkowski et al. | |
| 2004/0048622 | A1 | 3/2004 | Witkowski et al. | |
| 2004/0061591 | A1* | 4/2004 | Teich | 340/5.24 |
| 2004/0066936 | A1 | 4/2004 | Farris et al. | |
| 2004/0110472 | A1 | 6/2004 | Witkowski et al. | |
| 2004/0243813 | A1 | 12/2004 | Farris et al. | |
| 2005/0024184 | A1 | 2/2005 | Chuey | |
| 2005/0024185 | A1 | 2/2005 | Chuey | |
| 2005/0024229 | A1 | 2/2005 | Chuey | |
| 2005/0024230 | A1 | 2/2005 | Chuey | |
| 2005/0024254 | A1 | 2/2005 | Chuey | |
| 2005/0024255 | A1 | 2/2005 | Chuey | |
| 2005/0026601 | A1 | 2/2005 | Chuey | |
| 2005/0026602 | A1 | 2/2005 | Chuey et al. | |
| 2005/0026605 | A1 | 2/2005 | Guthrie et al. | |

FOREIGN PATENT DOCUMENTS

| | | |
|---|---|---|
| GB | 2 171 545 A | 8/1986 |
| GB | 2 182 790 A | 10/1986 |
| GB | 2 302 751 A | 6/1996 |
| GB | 2 336 433 | 4/1999 |
| GB | 2335773 A | 9/1999 |
| GB | 2 366 433 | 5/2000 |
| WO | WO 94/02920 | 7/1993 |
| WO | WO 00/29699 | 5/2000 |

OTHER PUBLICATIONS

Combined Search and Examination Report Under Sections 17 and 18(3) mailed Nov. 2, 2004 for European patent application GB0416753.2.

Combined Search and Examination Report Under Sections 17 and 18(3) for European Application No. GB0416742.5 dated Oct. 26, 2004.

German Search/Examination Document, German Patent Application No. 103 14 228.2, Dec. 14, 2004.

Combined Search and Examination Report Under Sections 17 and 18(3) mailed Nov. 30, 2004 for the corresponding European patent application GB 0415908.3.

Search and Examination Report Under Sections 17 and 18(3), Sep. 25, 2003.

Garage Door/Gate Remote Control User's Instructions (Model 39), Skylink Technologies Inc., 2002.

HomeLink Wirless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Starting with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Flash2Pass Easy Set Up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/markerabs.pl?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

* cited by examiner

PROGRAMMABLE INTEROPERABLE APPLIANCE REMOTE CONTROL

BACKGROUND OF THE INVENTION

1. Field of the Invention

The present invention relates to wireless remote control of appliances such as, for example, garage door openers.

2. Background Art

Home appliances, such as garage door openers, security gates, home alarms, lighting, and the like, may conveniently be operated from a remote control. Typically, the remote control is purchased together with the appliance. The remote control transmits a radio frequency activation signal which is recognized by a receiver associated with the appliance. Aftermarket remote controls are gaining in popularity as such devices can offer functionality different from the original equipment remote control. Such functionality includes decreased size, use with multiple appliances, increased performance, and the like. Aftermarket controllers are also purchased to replace lost or damaged controllers or to simply provide another remote control for accessing the appliance.

An example application for aftermarket remote controls are remote garage door openers integrated into an automotive vehicle. These integrated remote controls provide customer convenience, increased safety, multiple door operation, and enhanced vehicle value. Present in-dash vehicle integrated remote controls provide a "universal" or programmable garage door opener which learns characteristics of an existing transmitter then, when prompted by a user, generates an activation signal having the same characteristics.

Two types of activation signals are commonly used, those based on a fixed code and those based on a rolling code. Fixed code activation signals transmit the same code word with each activation transmission. Typically, the fixed code word may be set by the user in the receiver and any transmitters. This may be accomplished by setting jumpers or DIP switches to a matching pattern in the receiver and transmitters.

In contrast, rolling code activation signals include a different code word with each activation transmission. The rolling code code word is typically generated by encrypting a counter value with a crypt key. The crypt key is based on a transmitter identifier number maintained by the transmitter.

Rolling code appliance receivers must "learn" a transmitter before the transmitter can be used to activate the appliance. This is done by placing the receiver in learn mode and then keying the transmitter to send an activation signal. The activation signal includes the transmitter identifier and a rolling code word. The receiver uses the transmitter identifier to generate a crypt key. The receiver then uses the crypt key to decrypt the rolling code word, yielding a counter value. The receiver stores the counter value and crypt key associated with the transmitter identifier. The receiver then drops out of learn mode and is ready for normal operation.

One advantage of rolling code activation schemes is the ability of an appliance receiver to reject previously transmitted activation signals. This prevents false activation from reflections as well as from unauthorized access by retransmission of an activation signal grabbed from the air. The receiver accomplishes this task by decrypting a received rolling code to obtain a counter value maintained by the transmitter. This counter value is compared to an expected counter value associated with the transmitter identifier received together with the decrypted rolling code. If the received counter value is less than the expected counter value, the receiver treats the received activation signal as an invalid signal.

A problem therefore arises if two transmitters have the same transmitter identifier. After no more than one activation by either transmitter, one of the transmitters will have a counter value less than the other transmitter. When encrypted and transmitted, the lesser counter value will result in an activation signal ignored by the receiver, rendering that transmitter useless.

What is needed is a universal remote controller that may be programmed by an existing rolling code transmitter and then function together with the existing transmitter in activating an appliance.

SUMMARY OF THE INVENTION

The present invention provides a universal remote control that establishes a new transmitter identifier when programmed to a particular rolling code scheme.

A method of activating an appliance remotely controllable by an existing transmitter is provided. The appliance responds to a radio frequency activation signal based on one of a plurality of rolling code schemes. At least one activation signal transmitted from an existing transmitter is received. The activation signal includes an existing transmitter identifier. The activation signal is examined to determine which of the plurality of rolling code schemes was used by the existing transmitter to generate the received activation signal. A new transmitter identifier, different from the existing transmitter identifier, is determined based on the rolling code scheme. A new activation signal including the new transmitter identifier is transmitted based on the determined rolling code scheme.

In an embodiment of the present invention, the new activation signal is transmitted after receiving an activation input. Similarly, the determination as to which rolling scheme was used by the existing transmitter follows reception of a programming mode input.

In another embodiment of the present invention, determination is made as to whether the received activation signal is based on one of a plurality of fixed code schemes or on one of a plurality of variable code schemes. If the received activation signal is based on one of the fixed code schemes, a fixed code received in the activation signal is stored. The stored fixed code is used to transmit an activation signal.

Determining whether the received activation signal is based on one of the fixed code schemes may include receiving at least two activation signals from the existing transmitter and comparing at least corresponding portions of the received signals to determine any differences.

A system for operating an appliance is also provided. The system includes a receiver and a transmitter. Control logic operates in a learn mode to determine and store a new transmitter identifier different from any existing transmitter identifier received in at least one rolling code activation signal transmitted by the existing transmitter. In an operate mode, the control logic generates a new activation signal different from any activation signal transmitted by the existing transmitter. The new activation signal includes the new transmitter identifier.

A method of programming a programmable radio frequency appliance remote control is also provided. A signal, based on one of a plurality of activation schemes, is received from an existing radio frequency remote control. A determination is made as to whether the received signal was generated using one of a plurality of rolling code activation schemes. If so, an indication as to which rolling scheme was used to generate the received signal is stored. A new transmitter identifier, different from an existing transmitter identifier associated with the existing transmitter, is also determined and stored.

The above features, and other features and advantages of the present invention are readily apparent from the following detailed description thereof when taken in connection with the accompanying drawings.

DETAILED DESCRIPTION OF THE PREFERRED EMBODIMENTS

Figure 1:
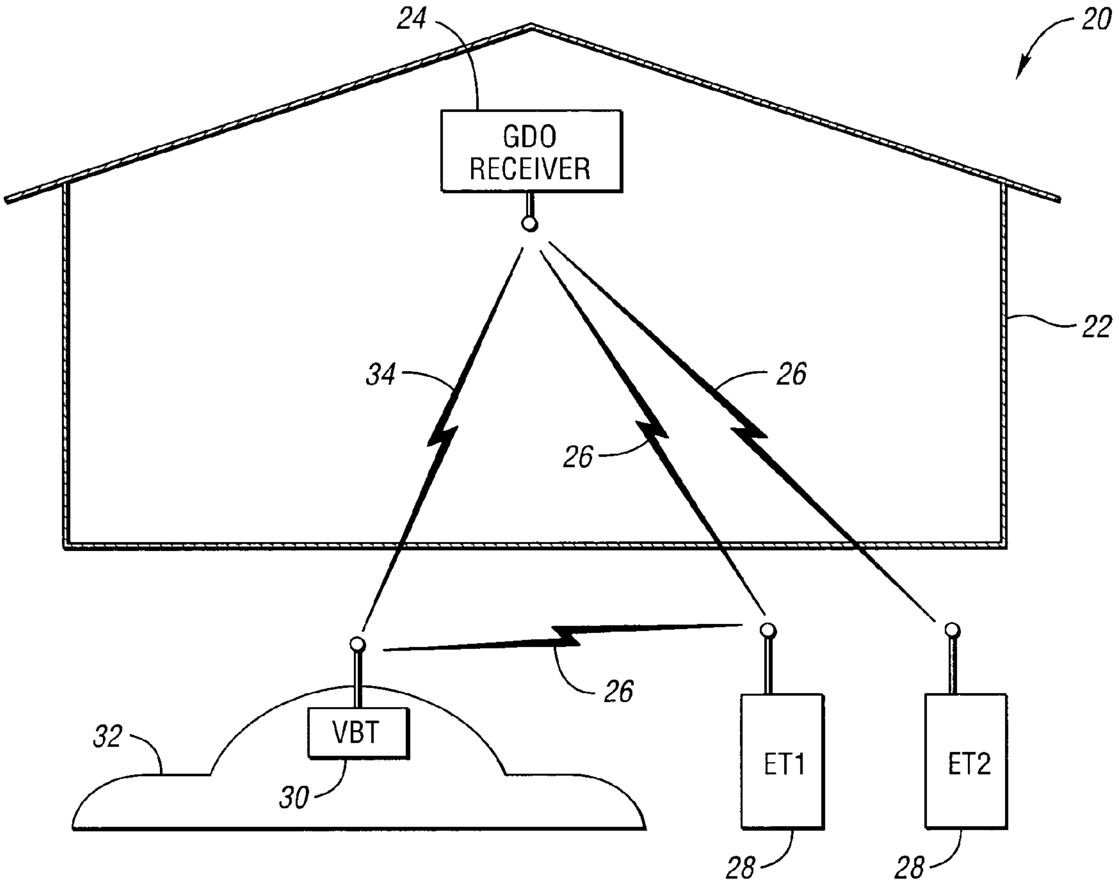
FIG. 1 is a block diagram illustrating an appliance control system according to an embodiment of the present invention.

Referring to FIG. 1, a block diagram illustrating an appliance control system according to an embodiment of the present invention is shown. An appliance control system, shown generally by 20, allows one or more appliances to be remotely controlled using radio transmitters. In the example shown, radio frequency remote controls are used to operate a garage door opener. However, the present invention may be applied to controlling a wide variety of appliances such as other mechanical barriers, lighting, alarm systems, temperature control systems, and the like.

Appliance control system 20 includes garage 22 having a garage door, not shown. Garage door opener (GDO) receiver 24 receives radio frequency control signals 26 for controlling a garage door opener. Activation signals 26 have a transmission scheme which may be represented as a set of receiver characteristics. One or more existing transmitters (ET) 28 generate radio frequency activation signals 26 exhibiting the receiver characteristics in response to a user depressing an activation button.

A user of appliance control system 20 may wish to add a new transmitter to system 20. For example, vehicle-based transmitter 30 may be installed in vehicle 32, which may be parked in garage 22. Vehicle-based transceiver 30 receives at least one activation signal 26 from existing transmitter 28. Vehicle-based transmitter 30 determines whether existing transmitter 28 operates using a fixed code scheme or a rolling code scheme by examining activation signal 26. If a rolling code scheme is used, vehicle-based transceiver 30 determines a new transmitter identifier compatible with the scheme used to generate activation signal 26. The new transmitter identifier is different from the transmitter identifier used by existing transmitter 28. Transceiver 30 generates activation signal 34 which, for rolling code systems, is different from an activation signal 26 sent by existing transmitter 28. This allows both existing transmitter 28 and vehicle-based transceiver 30 to be used with garage door opener receiver 24.

Figure 2:
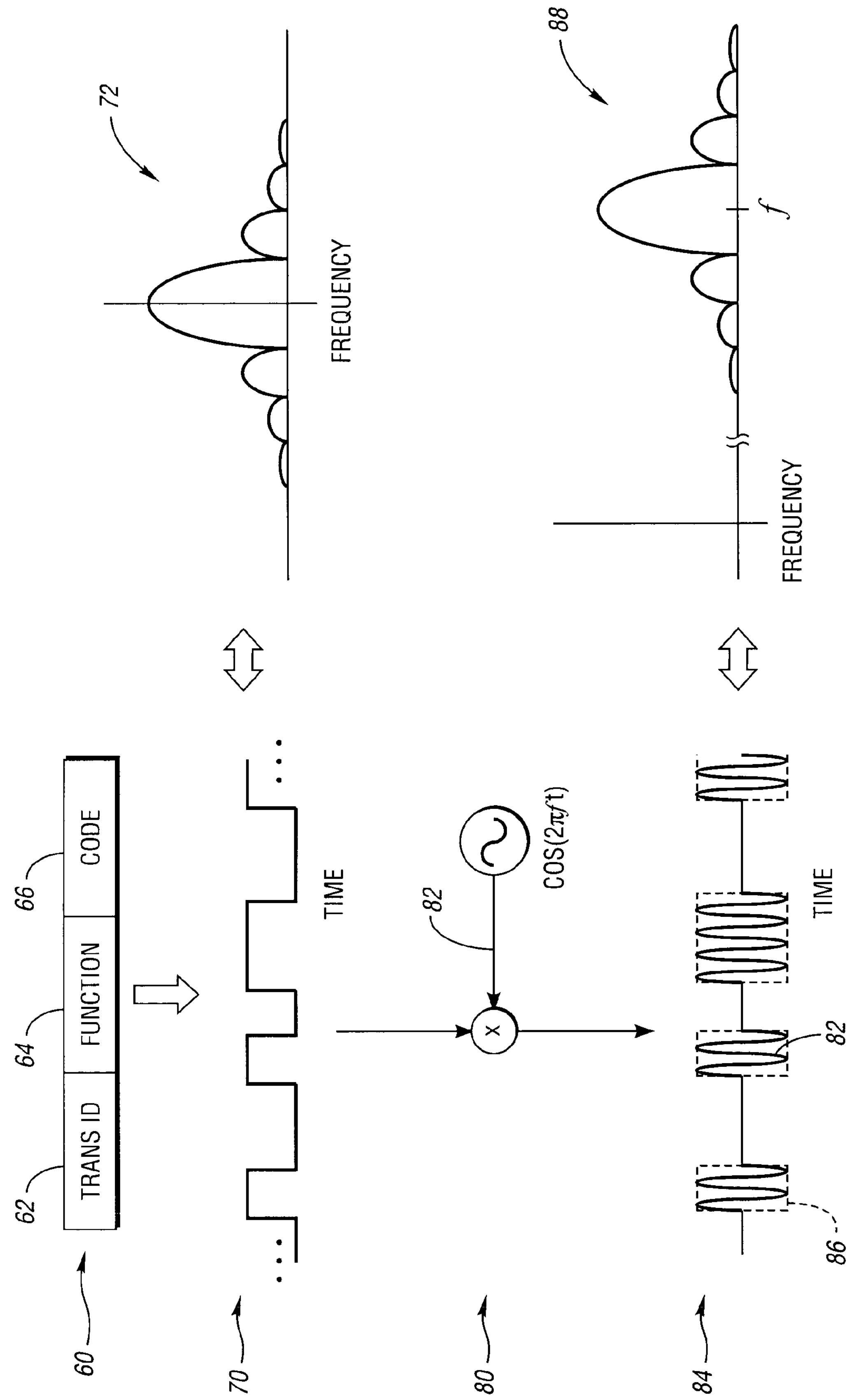
FIG. 2 is a schematic diagram illustrating activation signal characteristics according to an embodiment of the present invention.

Referring now to FIG. 2, a schematic diagram illustrating activation signal characteristics according to an embodiment of the present invention is shown. Information transmitted in an activation signal is typically represented as a binary data word, shown generally by 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a counter value. After each activation, the counter is incremented. The encryption technique is such that a sequence of encrypted counter values appears to be random numbers.

Data word 60 is converted to a baseband stream, shown generally by 70, which is an analog signal typically transitioning between a high voltage level and a low voltage level. Various baseband encoding or modulation schemes are possible, including polar signaling, on-off signaling, bipolar signaling, duobinary signaling, Manchester signaling, and the like. Baseband stream 70 has a baseband power spectral density, shown generally by 72, centered around a frequency of zero.

Baseband stream 70 is converted to a radio frequency signal through a modulation process shown generally by 80. Baseband stream 70 is used to modulate one or more characteristics of carrier 82 to produce a broadband signal, shown generally by 84. Modulation process 80, mathematically illustrated by multiplication in FIG. 2, implements a form of amplitude modulation commonly referred to as on-off keying. As will be recognized by one of ordinary skill in the art, many other modulation forms are possible, including frequency modulation, phase modulation, and the like. In the example shown, baseband stream 70 forms envelope 86 modulating carrier 82. As illustrated in broadband power spectral density 88, the effect of modulation in the frequency domain is to shift baseband power spectral density 72 to be centered around the carrier frequency, f, of carrier 82.

Figure 3:
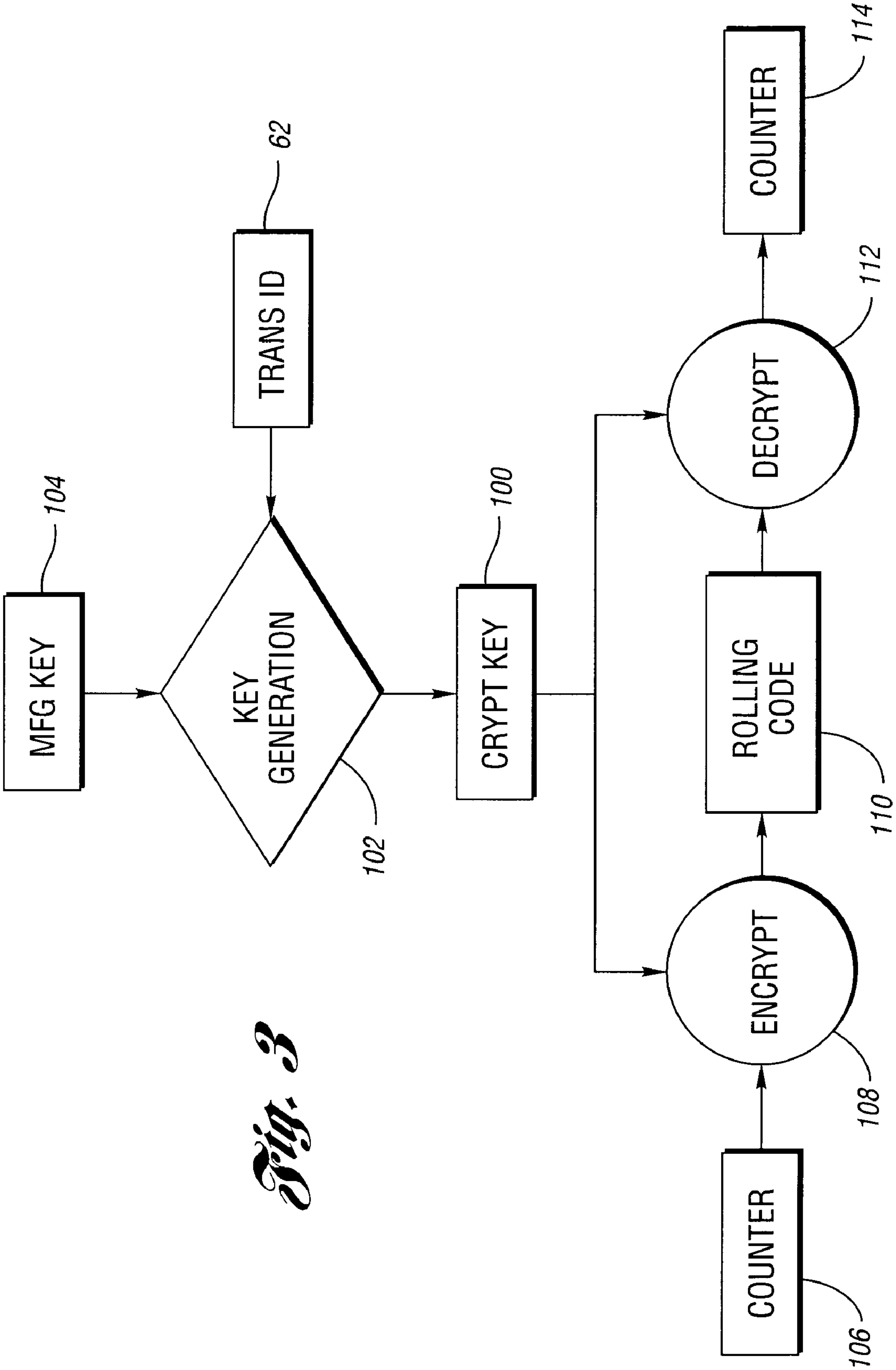
FIG. 3 is a block diagram illustrating rolling code operation that may be used with the present invention.

Referring now to FIG. 3, a block diagram illustrating rolling code operation that may be used with the present invention is shown. Remotely controlled systems using rolling code require crypt key 100 in both the transmitter and the receiver for normal operation. Typically, crypt key 100 is generated using key generation algorithm 102 based on transmitter identifier 62 and a manufacturing (MFG) key 104. Crypt key 100 and transmitter identifier 62 are then stored in a particular transmitter. Counter 106 is also initialized in the transmitter. Each time an activation signal is sent, the transmitter uses encrypt algorithm 108 to generate rolling code 110 from counter 106 using crypt key 100. The transmitted activation signal includes rolling code 110 and transmitter identifier 62.

A rolling code receiver is trained to a compatible transmitter prior to operation. The receiver is placed into a learn mode. Upon reception of an activation signal, the receiver extracts transmitter identifier 62. The receiver then uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver then saves counter 114 and crypt key 100 associated with transmitter identifier 62. As is known in the encryption art, encrypt algorithm 108 and decrypt algorithm 112 may be the same algorithm.

In normal operation, when the receiver receives an activation signal, the receiver first extracts transmitter identifier 62 and compares transmitter identifier 62 with all learned transmitter identifiers. If no match is found, the receiver rejects the activation signal. If a match is found, the receiver retrieves crypt key 100 associated with received transmitter identifier 62 and decrypts rolling code 110 from the received activation signal to produce counter 114. If received counter 106 matches counter 114 associated with transmitter identifier 62, activation proceeds. Received counter 106 may also exceed stored counter 114 by a preset amount for successful activation.

Another rolling code scheme generates crypt key 100 based on manufacturing key 104 and a "seed" or random number. An existing transmitter sends this seed to an appliance receiver when the receiver is placed in learn mode. The transmitter typically has a special mode for transmitting the seed entered, for example, by pushing a particular combination of buttons. The receiver uses the "seed" to generate crypt key 100. As will be recognized by one of ordinary skill in the art, the present invention applies to the use of a "seed" for generating a crypt key as well as to any other variable code scheme.

Figure 4:
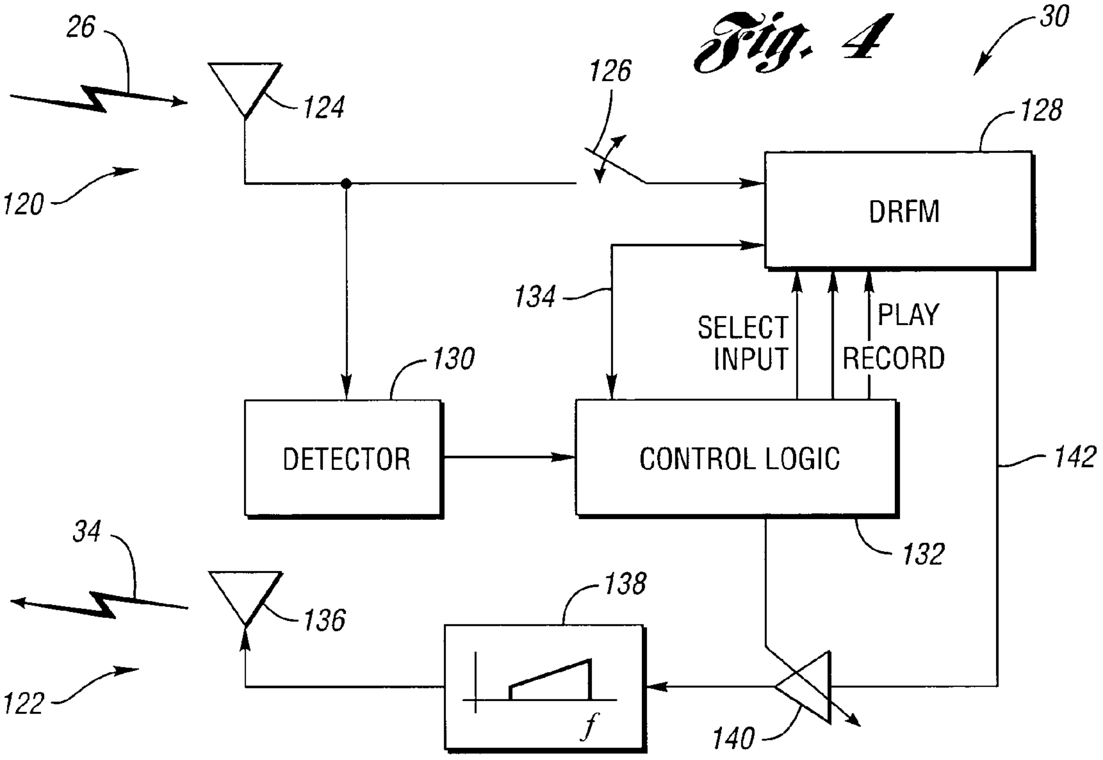
FIG. 4 is a block diagram of an appliance controller according to an embodiment of the present invention.

Referring now to FIG. 4, a block diagram of a wireless transceiver that may be used to implement the present invention is shown. Wireless transceiver 30 includes a receiver section, shown generally by 120, and a transmitter section, shown generally by 122. Receiver section 120 includes antenna 124, sampler 126, digital radio frequency memory (DRFM) 128, detector 130 and control logic 132. Control logic 132 monitors the output of detector 130, which receives input from antenna 124. When control logic 132 detects valid data from detector 130, control logic 132 waits until a period when the carrier is present on the signal received on antenna 124. Control logic 132 asserts the "record" input to DRFM 128. By asserting "play" and "select," control logic 132 can shift the sampled carrier from DRFM 128 into control logic 132 over bus 134.

Transmitter section 122 includes antenna 136, which may be the same as antenna 124, filter 138, variable gain amplifier 140, DRFM 128 and control logic 132. Control logic 132 can load DRFM 128 with a sampled carrier stream by asserting "select" and "record," then shifting the carrier stream into DRFM 128 on bus 134. The bit stream representing a carrier may have been previously received and sampled or may have been preloaded into control logic 132. Control logic 132 generates a modulated carrier on DRFM output 142 by asserting the "play" control line with the desired data word. The amplitude modulated signal on DRFM output 142 is amplified by variable gain amplifier 140 and filtered by filter 138 before transmission by antenna 136.

A DRFM transceiver similar to the system illustrated in FIG. 4 is described in U.S. patent application Ser. No. 10/306,077, entitled "Programmable Transmitter and Receiver Including Digital Radio Frequency Memory," filed Nov. 27, 2002, which is herein incorporated by reference in its entirety.

Figure 5:
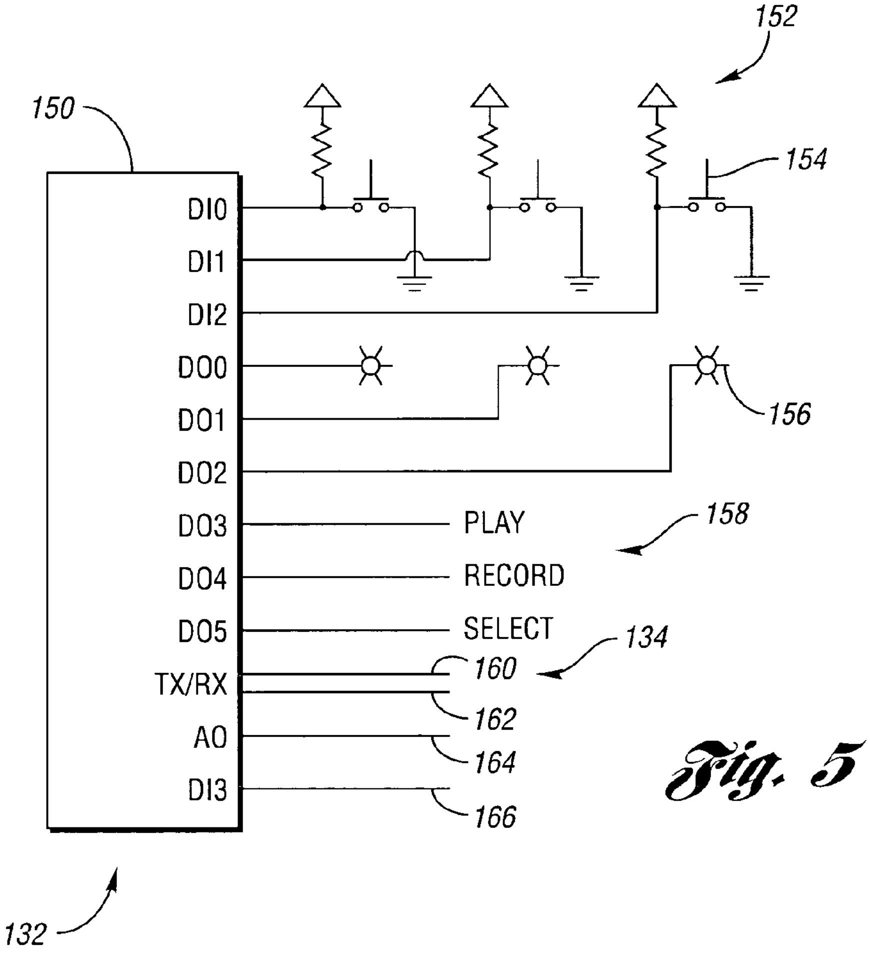
FIG. 5 is a block diagram illustrating control logic and a user interface according to an embodiment of the present invention.

Referring now to FIG. 5, a block diagram illustrating control logic and a user interface according to an embodiment of the present invention is shown. Control logic 132 may be implemented with microcontroller 150 including one or more processors, volatile memory, scratch memory, interface electronics, and the like. Alternatively, or in addition to microcontroller 150, control logic 132 may be implemented with discrete analog and/or digital components, programmable logic devices, custom integrated circuits, and the like.

A user interface, shown generally by 152, provides means for accepting input from a user and for displaying output to a user. The example illustrated in FIG. 5 supports three channels. Each channel includes a pushbutton, one of which is indicated by 154, and an indicator lamp, one of which is indicated by 156. Each pushbutton 154 drives a digital input (DI) on microcontroller 150. Each lamp 156 is driven by a digital output (DO) on microcontroller 150. Pushbuttons 154 may be used as activation and programming mode inputs.

Microcontroller 150 provides DRFM control signals 158 described above as "play," "record" and "select." Microcontroller 150 implements bus 134 using serial data line 160 and serial clock line 162. Microcontroller 150 provides variable amplifier control 164 from an analog output (AO). Alternatively, variable amplifier 140 may be controlled by a digital output from microcontroller 150 which is converted into an analog signal by an external analog-to-digital converter. Finally, microcontroller 150 includes digital input detector data 166 for sampling the output of detector 130 during learn mode.

Figure 6:
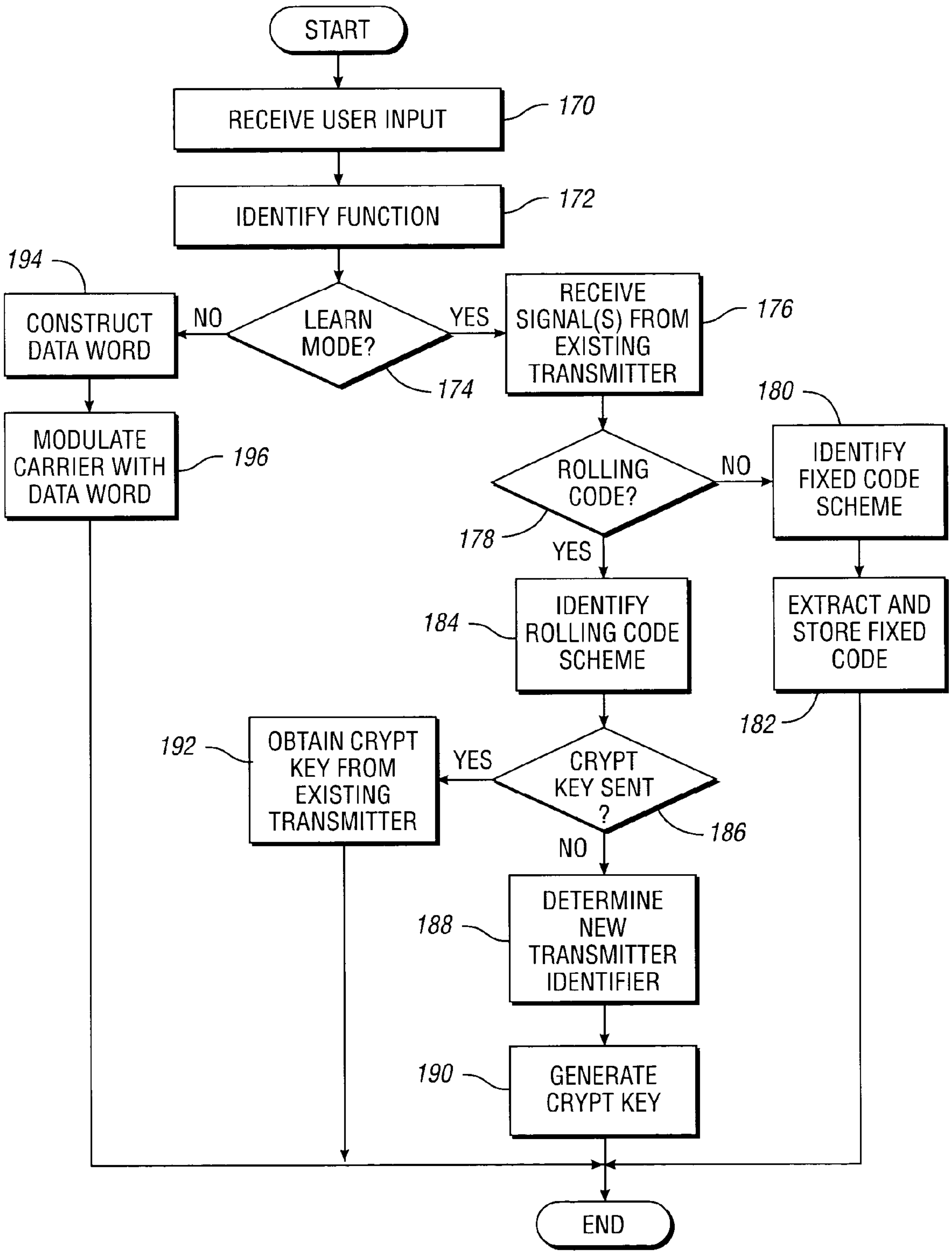
FIG. 6 is a flow diagram illustrating universal controller operation according to an embodiment of the present invention.

Referring now to FIG. 6, a flow diagram illustrating universal controller operation according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and the aspects are shown in sequential flow chart form for ease of illustration.

User input is received, as in block 170. For example, microcontroller 150 can detect a depression of pushbutton switch 154. The desired function is identified, as in block 172. If pushbutton 154 is held for a brief period of time, the user is providing an activation input. If the user depresses pushbutton 154 for an extended period of time, the user places the channel represented by pushbutton 154 into learn mode.

A determination is made as to whether or not the programmable controller is in learn mode, as in block 174. If so, one or more signals from existing transmitters are received, as in block 176. Programmable controller 30 preferably provides an output signal prompting the user to key existing transmitter 28. Once programmable transmitter 30 receives activation signal 26 from existing transmitter 28, a determination is made as to whether or not activation signal 26 uses rolling code, as in block 178. One method for determining whether activation signal 26 is a fixed code signal or a rolling code signal is to have the user key existing transmitter 28 twice. If activation signal 26 is the same in both instances, activation 26 is a fixed code signal. If the data word in activation 26 varies between the two transmissions, activation signal 26 is a rolling code signal.

If the received activation signal is not a rolling code signal, the fixed code scheme is identified, as in block 180. The scheme used to generate activation signal 26 may be determined from one or more characteristics of activation signal 26. These characteristics include the number of bits transmitted, the base band data rate, the base band modulation scheme, the broadband frequency, the broadband modulation scheme, and the like. Once the fixed code scheme is identified, the fixed code is extracted and stored, as in block 182.

Returning to block 178, if received activation signal 26 was generated using a rolling code scheme, the rolling code scheme is identified, as in block 184. Once again, identifying the rolling code scheme may be accomplished by examining the characteristics of activation signal 26. The rolling code scheme may also be identified through programming mode input. A check is made in block 186 to determine if the crypt key was sent in transmission 26, as in block 186. If not, a new transmitter identifier is determined, as in block 188. A crypt key is generated, as in block 190, using the new transmitter identifier and/or a random number seed sent in transmission signal 26. If the crypt key was sent in signal 26, the crypt key is obtained from the existing transmitter, as in block 192. The crypt key, transmitter identifier, and any other relevant information is stored in memory associated with the channel being trained.

Returning now to block 174, if user input indicates an activation input was received, a data word is constructed, as in block 194. Construction of the data word is based on the identified fixed or rolling code scheme associated with the activation input channel. In the case of a rolling code scheme, the data word includes the new transmitter identifier and a rolling code value. A carrier is modulated with the data word, as in block 196, and transmitted as activation signal 34.

Once transceiver 30 has been programmed to generate a rolling code activation signal, appliance receiver 24 is trained to learn new transmitter identifier 62 held by transceiver 30. This is accomplished by placing appliance receiver 24 in learn mode and activating the appropriate input channel on transceiver 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of activating an appliance remotely controllable by an existing transmitter, the appliance responding to a radio frequency activation signal based on one of a plurality of rolling code schemes, the method comprising:

receiving at least one activation signal transmitted from the existing transmitter, the activation signal including an existing transmitter identifier;

examining the at least one received activation signal to determine which of the plurality of rolling code schemes was used by the existing transmitter to generate the received activation signal;

determining a new transmitter identifier different from the existing transmitter identifier based on the determined rolling code scheme; and transmitting a new activation signal based on the determined rolling code scheme, the new activation signal including the new transmitter identifier.

2. The method of claim 1 wherein the new activation signal is transmitted based on receiving an activation input.

3. The method of claim 1 wherein the determination of which rolling code scheme was used by the existing transmitter is based on receiving a programming mode input.

4. The method of claim 1 wherein the appliance responds to a radio frequency activation signal based on one of a plurality of fixed code schemes or one of the plurality of rolling code schemes, the method further comprising:

determining whether the received activation signal is based on one of the plurality of fixed code schemes or on one of the plurality of rolling code schemes; and if the received activation signal is based on one of the fixed code schemes, storing a fixed code received in the activation signal and using the stored fixed code to transmit an activation signal.

5. The method of claim 4 wherein determining whether the received activation signal is based on one of the fixed code schemes comprises:

receiving at least two activation signals from the existing transmitter; and comparing at least a portion of the at least two received activation signals to determine any differences.

6. A system for operating an appliance, the appliance responding to an activation signal transmitted from an existing radio frequency transmitter, the system comprising:

a receiver operable to receive any of a plurality of radio frequency activation signals;

a transmitter operable to transmit any of the plurality of radio frequency activation signals; and control logic in communication with the receiver and the transmitter, the control logic operating in a learn mode and an operate mode, the control logic in learn mode determining and storing a new transmitter identifier different from any existing transmitter identifier received in at least one rolling code activation signal transmitted by the existing transmitter, the control logic in operate mode generating a new activation signal different from any activation signal transmitted by the existing transmitter, the new activation signal including the new transmitter identifier.

7. The system of claim 6 wherein the control logic supports a plurality of channels, each channel programmable to a different existing transmitter.

8. The system of claim 6 further comprising a user interface placing the control logic in learn mode based on a first user input and causing transmission of the new activation signal based on a second user input.

9. The system of claim 6 wherein the control logic is operable in learn mode to determine whether the at least one activation signal transmitted by the existing transmitter is based on a rolling code scheme or a fixed code scheme.

10. The system of claim 9 wherein, if the at least one activation signal transmitted by the existing transmitter is a fixed code scheme, the control logic extracting and storing a fixed code from the at least one activation signal transmitted by the existing transmitter.

11. The system of claim 10 wherein the control logic in operate mode generates an activation signal including the stored fixed code.

12. The system of claim 9 wherein the control logic is operable to determine fixed code scheme or rolling code scheme based on at least two activation signals transmitted by the existing transmitter.

13. The system of claim 6 wherein the control logic determines which of a plurality of rolling code schemes was used by the existing transmitter based on receiving a programming mode input.

14. A method of programming a programmable radio frequency appliance remote control comprising:

receiving a signal from an existing radio frequency remote control, the signal based on one of a plurality of activation schemes;

determining if the received signal was generated using one of a plurality of rolling code activation schemes;

if so, storing an indication as to which rolling code scheme was used to generate the received signal; and determining and storing a new transmitter identifier different from an existing transmitter identifier associated with the existing transmitter.

15. The method of claim 14 further comprising:

receiving an activation input signal; and transmitting a new activation signal based on the stored rolling code scheme indication and on the new transmitter identifier.

16. The method of claim 14 further comprising:

determining if the received signal was generated using one of a plurality of fixed code activation schemes;

if so, storing an indication as to which fixed code scheme was used to generate the received signal; and extracting and storing a fixed code from the received signal.

17. The method of claim 16 further comprising:

receiving an activation input signal; and transmitting a new activation signal based on the stored fixed code scheme indication and on the stored fixed code.

18. The method of claim 14 wherein receiving a signal from the existing radio frequency remote control comprises receiving a plurality of signals from the existing radio frequency remote control and wherein determining if the received signal was generated using one of the plurality of rolling code activation schemes is based on an examination of at least two of the plurality of received signals.

19. The method of claim 14 wherein the determination of which rolling code scheme was used to generate the received signal is based on receiving a programming mode input.

* * * * *